US012784066B2

(12) United States Patent
Tzur et al.

(10) Patent No.: US 12,784,066 B2
(45) Date of Patent: Nov. 3, 2026

(54) DYNAMIC ACTION CLASSIFICATION USING MACHINE LEARNING TECHNIQUES

(71) Applicant: Dell Products L.P., Round Rock, TX (US)

(72) Inventors: Anat Parush Tzur, Beer Shiva (IL); Abhishek Sharma, Berlin (DE); Rahul Namdev, Bhopal (IN); Parag Suryakant Ved, Round Rock, TX (US); Prateek Srivastava, Cedar Park, TX (US); Carlos Jose De Olaguibel, Round Rock, TX (US); Anvesh Kalia, Round Rock, TX (US); Shailesh Dhekne, Pune (IN); Katarina Kovacova, Bratislava (SK); Anne E. Guinard, Austin, TX (US); Ryan P. Weninger, Austin, TX (US); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 782 days.

(21) Appl. No.: 18/197,383

(22) Filed: May 15, 2023

(65) Prior Publication Data

US 2024/0386308 A1 Nov. 21, 2024

(51) Int. Cl.
*G06Q 30/0202* (2023.01)
*G06N 20/00* (2019.01)

(52) U.S. Cl.
CPC ......... *G06Q 30/0202* (2013.01); *G06N 20/00* (2019.01)

(58) Field of Classification Search
CPC ............... G06N 20/00; G06Q 30/0202; G06Q 30/0206; G06Q 10/0631
See application file for complete search history.

(56) References Cited

U.S. PATENT DOCUMENTS 9,449,271 B2 9/2016 Wang et al.
9,552,231 B2 1/2017 McLean
(Continued)

FOREIGN PATENT DOCUMENTS

JP 7086946 B2 10/2019

OTHER PUBLICATIONS

Machine Learning Interview, Target Encoding for Categorical Features, https://machinelearninginterview.com/topics/machine-learning/target-encoding-for-categorical-features/ , Jul. 2, 2021.

*Primary Examiner* — William S Brockington, III
(74) *Attorney, Agent, or Firm* — Ryan, Mason & Lewis, LLP

(57) ABSTRACT

Methods, apparatus, and processor-readable storage media for dynamic action classification using machine learning techniques are provided herein. An example computer-implemented method includes generating at least one resource-related forecast by processing, using at least one regression model, resource-related data within at least one predetermined temporal period; converting at least a portion of the at least one resource-related forecast to at least one resource-related action forecast using one or more machine learning techniques in conjunction with one or more temporal lag values; classifying at least one resource-related action associated with at least a portion of the at least one predetermined temporal period by processing at least a portion of the at least one resource-related action forecast using at least one classification model; and performing one or more automated actions based at least in part on the at least one classified resource-related action.

20 Claims, 5 Drawing Sheets

(56) References Cited

U.S. PATENT DOCUMENTS

| | | | | |
|---|---|---|---|---|
| 11,663,668 | B1 * | 5/2023 | Bloom | G06Q 40/06<br>705/36 R |
| 2017/0169344 | A1 * | 6/2017 | Mangharam | G06N 5/025 |
| 2019/0180358 | A1 * | 6/2019 | Nandan | G06F 18/2113 |
| 2020/0118024 | A1 * | 4/2020 | Kajino | G06F 11/0787 |
| 2022/0076848 | A1 * | 3/2022 | Garg | G16H 50/20 |
| 2023/0289698 | A1 * | 9/2023 | Bly | G06Q 10/06393 |

* cited by examiner

DYNAMIC ACTION CLASSIFICATION USING MACHINE LEARNING TECHNIQUES

FIELD

The field relates generally to information processing systems, and more particularly to resource management in such systems.

BACKGROUND

Conventional resource-related classification techniques commonly rely on static assumption-based processes and leverage limited types of data. Accordingly, such techniques can often lead to inaccurate results and/or inconsistent results across geographically varying entities and/or different temporal parameters.

SUMMARY

Illustrative embodiments of the disclosure provide techniques for dynamic action classification using machine learning techniques.

An exemplary computer-implemented method includes generating at least one resource-related forecast by processing, using at least one regression model, resource-related data within at least one predetermined temporal period. The method also includes converting at least a portion of the at least one resource-related forecast to at least one resource-related action forecast using one or more machine learning techniques in conjunction with one or more temporal lag values. Additionally, the method includes classifying at least one resource-related action associated with at least a portion of the at least one predetermined temporal period by processing at least a portion of the at least one resource-related action forecast using at least one classification model. Further, the method also includes performing one or more automated actions based at least in part on the at least one classified resource-related action.

Illustrative embodiments can provide significant advantages relative to conventional resource-related classification techniques. For example, problems associated with inaccurate and/or inconsistent results are overcome in one or more embodiments through dynamically classifying one or more resource-related actions using machine learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
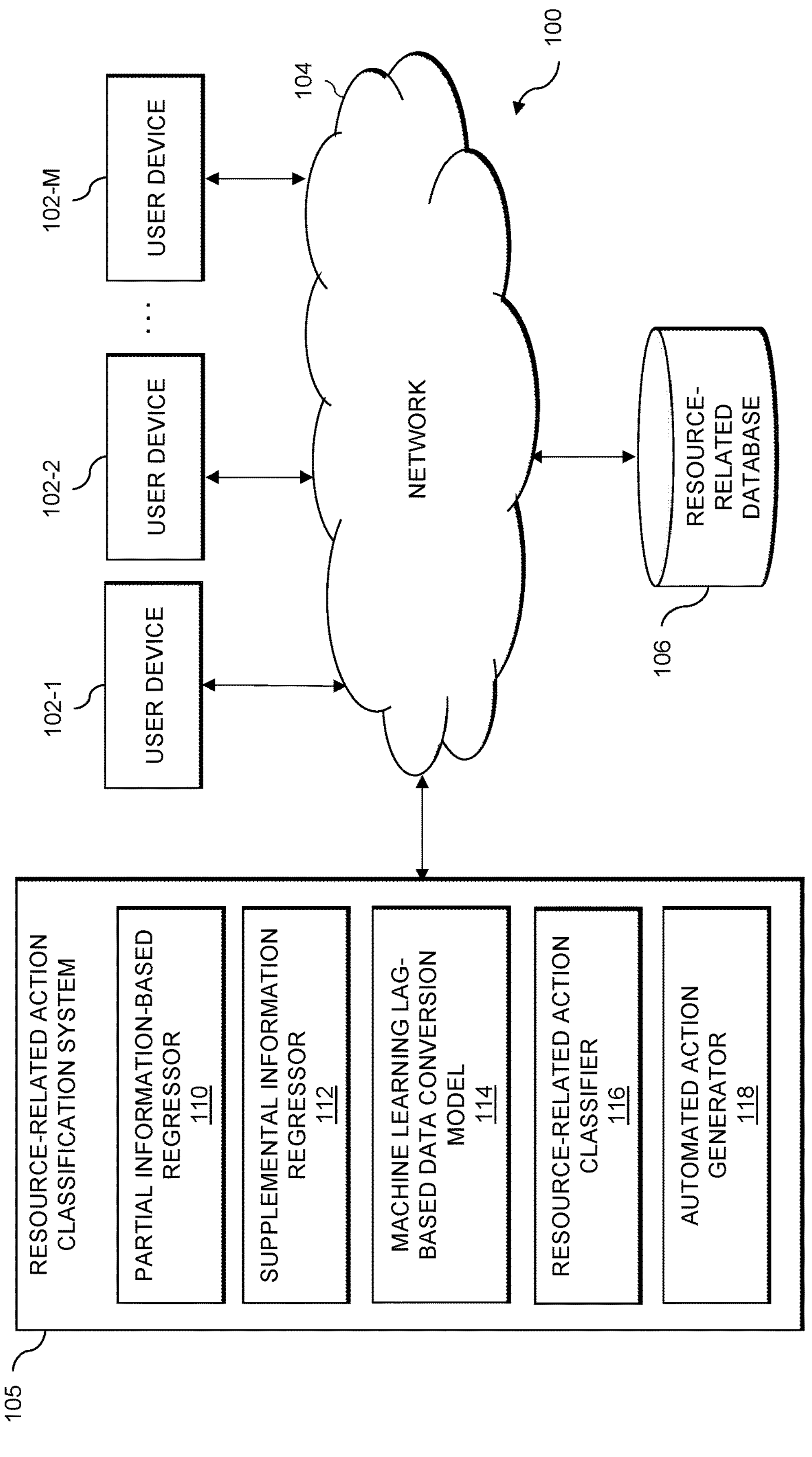
FIG. 1 shows an information processing system configured for dynamic action classification using machine learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is resource-related action classification system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, resource-related action classification system 105 can have an associated resource-related database 106 configured to store data pertaining to various resources and actions related thereto, associated with multiple temporal periods.

The resource-related database 106 in the present embodiment is implemented using one or more storage systems associated with resource-related action classification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with resource-related action classification system 105 are one or more input-output devices, which illustratively comprise keyboards, displays or other types of input-output devices in any combination. Such input-output devices can be used, for example, to support one or more user interfaces to resource-related action classification system 105, as well as to support communication between resource-related action classification system 105 and other related systems and devices not explicitly shown.

Additionally, resource-related action classification system 105 in the FIG. 1 embodiment is assumed to be implemented using at least one processing device. Each such processing device generally comprises at least one processor and an associated memory, and implements one or more functional modules for controlling certain features of resource-related action classification system 105.

More particularly, resource-related action classification system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows resource-related action classification system 105 to communicate over the network 104 with the user devices 102, and illustratively comprises one or more conventional transceivers.

The resource-related action classification system 105 further comprises partial information-based regressor 110, supplemental information regressor 112, machine learning lag-based data conversion model 114, resource-related action classifier 116, and automated action generator 118.

It is to be appreciated that this particular arrangement of elements 110, 112, 114, 116 and 118 illustrated in resource-related action classification system 105 of the FIG. 1 embodiment is presented by way of example only, and alternative arrangements can be used in other embodiments. For example, the functionality associated with elements 110, 112, 114, 116 and 118 in other embodiments can be combined into a single module, or separated across a larger number of modules. As another example, multiple distinct processors can be used to implement different ones of elements 110, 112, 114, 116 and 118 or portions thereof.

At least portions of elements 110, 112, 114, 116 and 118 may be implemented at least in part in the form of software that is stored in memory and executed by a processor.

It is to be understood that the particular set of elements shown in FIG. 1 for dynamic action classification using machine learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, resource-related action classification system 105 and resource-related database 106 can be on and/or part of the same processing platform.

An exemplary process utilizing elements 110, 112, 114, 116 and 118 of an example resource-related action classification system 105 in computer network 100 will be described in more detail with reference to the flow diagram of FIG. 3.

Accordingly, at least one embodiment includes dynamic action classification using machine learning techniques. Such an embodiment includes implementing at least one data-driven approach to accurately predict and/or classify resource-related actions (e.g., cash collections) in accordance with one or more temporal intervals (e.g., weekly levels, quarterly levels, etc.). By way merely of example and illustration, consider a use case involving resource-related actions such as cash forecasting. In such an example use case, one or more embodiments can include processing invoice data and historical financial data (e.g., bank statements) using one or more artificial intelligence techniques to generate one or more revenue forecasts, convert at least a portion of such forecasts to payment forecasts using one or more lags, and forecasting actual receivables based at least in part thereon. Leveraging such receivables forecasts, at least one embodiment can include initiating and/or performing one or more automated actions, as further detailed herein. By way merely of example, such automated actions can include allocating resources based at least in part on such forecasts (e.g., investment-related actions, avoidance of short-term debt to cover one or more obligations, etc.).

As used herein, using one or more lags (also referred to as lagging) refers to implementing a time series technique to shift values forward one or more time steps, or equivalently, to shift the times in a corresponding index backward one or more steps. In either case, the effect of such a lag is that the observation(s) in the lagged series will appear to have happened later in time. Accordingly, at least one embodiment includes implementing at least one lagged resource-related action solution (e.g., an order solution) that facilitates automating the classification of one or more resource-related actions (e.g., order-related transactions) into defined categories.

As detailed herein, one or more embodiments include enhancing the analytical strength of classification and/or forecast techniques by processing data associated with historical user behavior (e.g., user behavior pertaining to a given resource and/or one or more actions related thereto). Such an embodiment can also include facilitating and/or improving performance of one or more resource-related actions based at least in part on one or more general trends and/or one or more user-specific trends determined using artificial intelligence techniques (e.g., one or more non-linear trends determined using one or more machine learning techniques). Additionally, such an embodiment can include generating and/or increasing insight(s) into one or more correlations between lagged resource-related data and actual (e.g., real-time and/or confirmed) resource-related data, as well as reducing (e.g., minimizing) the number of assumptions and/or manual adjustments required in classification and/or forecasting activities.

One or more embodiments includes bifurcating data into lags per a given temporal parameter (e.g., per week) and determining any correlation(s) between the lagged data and corresponding actual data. Such an embodiment can include identifying and analyzing one or more lags that are important for a given temporal parameter (e.g., for a given quarter) as compared to data averaged across multiple temporal parameters. Additionally, such an embodiment can include dynamically selecting one or more of the identified lags and dividing the lag(s) into a given number of sub-portions (e.g., quarters) to be used in connection with further processing.

As noted above, and by way merely of example, consider a use case involving resource-related actions such as cash forecasting. In such an embodiment, an order predictor can include supplementary data derived from different global reporting center teams that are supporting data points used to build an artificial intelligence-based forecasting model. Because a goal of such an embodiment includes increasing correlation, feature selection can be performed based at least in part on the correlation of features within related data (e.g., bank statement grand totals) such that at least one regressor's impact will increase. Such an embodiment can also include converting an order predictor data into a payment predictor data by determining an underlying distribution of close dates.

By way of further illustration, in such an example use case, consider that when an order is placed, that order may not be invoiced immediately, but might be invoiced in intervals. Based at least in part on such knowledge, user behavior for a given temporal parameter (e.g., for each quarter) can be analyzed using at least one lagged order value. Additionally, and by way merely of example, at least one embodiment can include dynamically selecting the lags and dividing the lags into temporal portions (e.g., quarters). These quarters will individually encompass different choices of lags and provide, as a whole, dynamical lag choices. Utilizing both level of granularity with respect to lag choices facilitates mapping individual user journeys, as such an embodiment includes aggregating user-level data and generic resource-related data. Also, for a new user with no historical data, one or more embodiments (using at least one artificial intelligence model) attempts to select data based at least in part on one or more historically relevant parameters.

By way merely of example, consider the following use case with respect to mapping individual user journeys. Individual user-based data, such as, e.g., invoice-level data, can be used to determine and/or generate user-centric metrics such as average delay in payment, deviation in delay of payment, etc., whereas, other metrics derived from the same data such as go to market information, invoice value, etc., represent generic features and are attributes of the transaction(s). Regarding such order-level data, revenue is typically an aggregated value and is not always associated with a single user. Accordingly, in accordance with at least one embodiment, a lag-based model can be built and/or trained, broken down into temporally-based portions (e.g., based fiscal quarters of an enterprise) which are executed separately to improve the correlation of order data with a target variable (e.g., revenue) and also to accommodate and/or approximate a manner in which the enterprise receives payments from orders.

By way of further example, such temporal bases can include a weekly granularity, whereas the invoice data can be processed at a transaction level. As such, based at least in part on open invoices (e.g., unpaid invoices) being processed using learning from individual user metrics derived from closed invoices (e.g., paid invoices), one or more embodiments can include predicting one or more dates of closure for one or more of the open invoices, and aggregating, based at least in part thereon, the revenue at a weekly level (e.g., similar to order data). In such an embodiment, the output of both of these models can be passed as supporting data to a final time-series model for revenue forecasting.

Instead of directly using lagged-based resource-related actions (e.g., orders), at least one embodiment can include dynamically selecting one or more lags which are then divided into multiple parts. In a given example, lags associated with orders from quarter 1 through quarter 3 are associated with the same lag value, whereas lags associated with orders from quarter 4 are associated with a different lag value and, as such, are processed separately. Additionally, resource-related actions associated with different types of users (e.g., enterprises versus individual users) can be treated different by the artificial intelligence techniques detailed in connection with one or more embodiments (e.g., an artificial intelligence model can be into partitioned and/or segmented into multiple portions and/or fragments).

By way merely of example and illustration, given that the behavior of users/customers (e.g., payment activity, order activity, etc.) can be quite different when comparing enterprises and users/customers, one or more embodiments include fragmenting at least one artificial intelligence model so as to be built and/or trained and executed separately to accommodate individual user/customer behavior per enterprise segment.

Accordingly, as detailed herein, one or more embodiments include classifying resource-related actions in at least one dynamic environment by processing lagged resource-related activity data. Such an embodiment, by leveraging lagged resource-related activity data, reduces and/or eliminates subject matter expert dependencies as well as geographic region dependencies.

By way of illustration, referring again to an order-based and/or cash forecasting use case example, one or more embodiments can include obtaining payment data associated with, e.g., weekly lags. However, because order data can be used as supporting data, such an embodiment also includes enhancing correlation(s) between order data and one or more target values. For example, such an embodiment can include mapping order data to payment data to determine such correlation(s) and further provide enhancements to the order data by using at least a portion of the data for general sum actions as well as using at least a portion of the data as part of the artificial intelligence-based modeling process. Accordingly, such an embodiment can include building and/or training one or more machine learning models for converting one or more order predictor values into one or more payment predictor values.

In connection with such an example embodiment, feature extraction can be carried out by calculating a set of data features associated with at least one given temporal parameter. For instance, such an embodiment can include calculating and/or determining, for each week, a set of thirteen features, wherein the values of the features correspond to the values of a given item or entry for the previous thirteen weeks. By way merely of example, at least one embodiment can include using at least one temporal parameter-based such as a moving average, one or more deviations, entropy, minimum value(s), maximum value(s), etc. per temporal feature (like aggregated on the basis of quarter, month, week etc.). For instance, the moving average can be used to reduce noise in the data and can also be used as a smoothing feature. Accordingly, in one or more embodiments, the lags (i.e., shift(s) in data) can be based at least in part on a window of a given temporal period of, e.g., 13 weeks, for a use case and/or implementation that observes weekly seasonality in order data.

Additionally, such an embodiment also includes defining at least one target variable associated with the feature extraction, and further performing feature selection. In an attempt to increase correlation, one or more embodiments can include performing feature selection based at least in part on the correlation of the features with the at least one defined target variable (e.g., a bank statement grand total value).

By way merely of illustration and example, similar to the concept of target encoding, one or more embodiments can include building and/or training at least one lag-based model broken down into separate Q4 and Q1-3 portions (e.g., in a use case wherein Q4 has a different distribution than Q1-3) to improve the correlation of order data with the target variable (e.g., revenue) and to accommodate and/or approximate the actual manner in which the given enterprise receives payments from placed orders. Because such an example embodiment can include using, for instance, lags of 13 weeks, such an embodiment can also include using a feature selection mechanism to extract only the significant lags while modeling the lags versus the target variable using a linear regression model.

At least one embodiment includes segmenting particular resource-related data (e.g., order predictor data) by using one or more artificial intelligence techniques and building and/or training a different model for different data segments. By way merely of example and illustration, consider a use case wherein, in connection with order data, different artificial intelligence models are generated and/or trained for a market share segmentation and a product group segmentation. Also, in such an example use case, at least one embodiment can include dividing actual product-related revenue values into the product groups and/or user-related groups.

Figure 2:
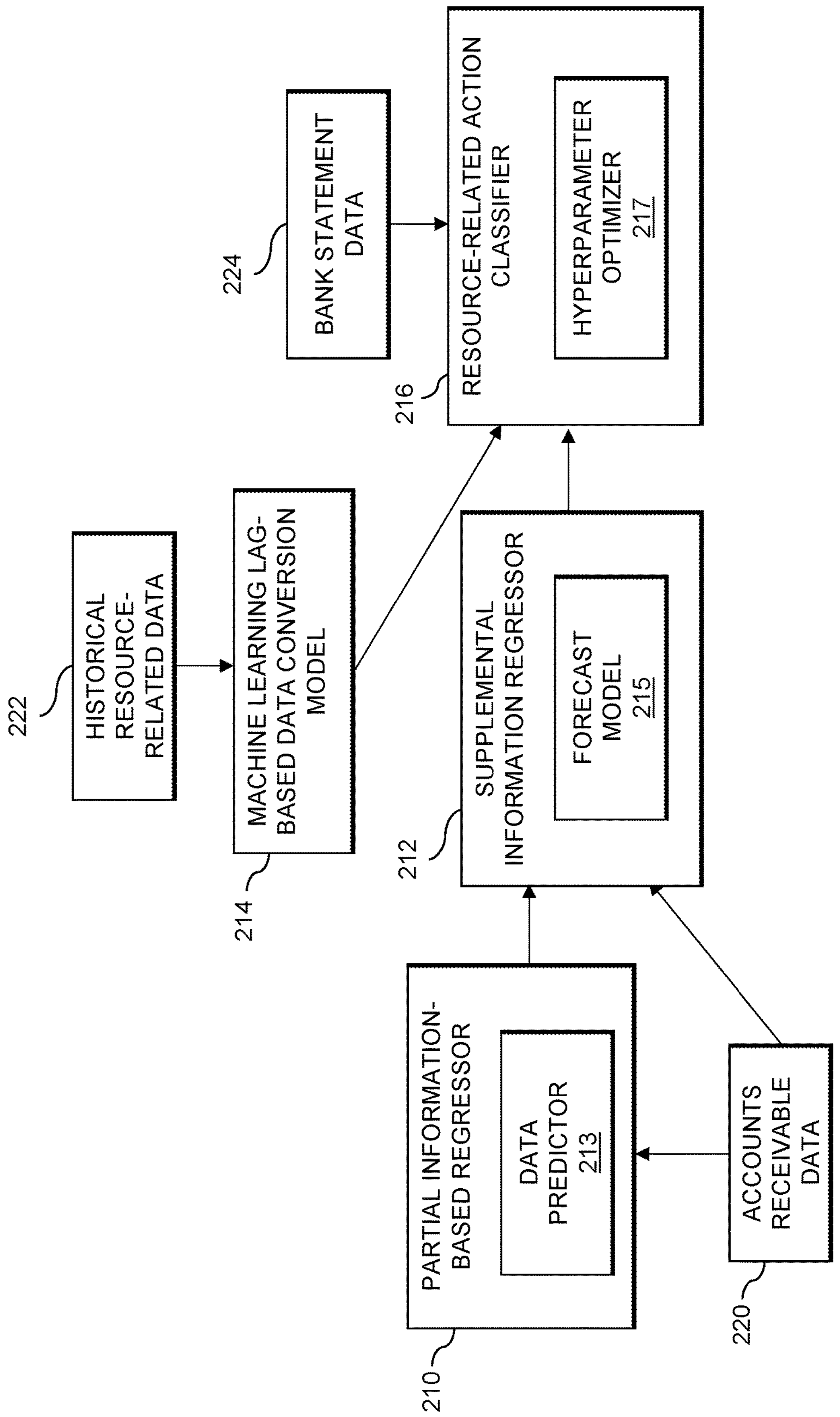
FIG. 2 shows example system architecture in an illustrative embodiment.

FIG. 2 shows example system architecture in an illustrative embodiment. By way of illustration, FIG. 2 depicts system architecture in connection with a cash forecast use case example. Specifically, FIG. 2 depicts accounts receivable data 220 (e.g., invoice level data), at least a portion of which is processed by partial information-based regressor 210. In such an example use case, partial information-based regressor 210 can represent an open invoice cash flow regressor, and can include a data predictor 213 such as, e.g., an invoice payment data predictor which can include at least one regression model (e.g., at least one decision tree gradient boosting algorithm such as, for example, CatBoost).

As also depicted in FIG. 2, at least a portion of accounts receivable data 220, in conjunction with the output(s) generated by partial information-based regressor 210, can be processed by supplemental information regressor 212. In such an example use case, supplemental information regressor 212 can represent an accounts receivable cash flow regressor (e.g., at least one decision tree gradient boosting algorithm such as, for example, CatBoost), and can include a forecast model 215 such as, e.g., an accounts receivable cash flow forecast model.

Additionally, FIG. 2 depicts historical resource-related data 222 (which, in this example use case, can include orders prediction(s) (which includes market segment level data)), at least a portion of which is processed by machine learning lag-based data conversion model 214. In such an example use case, machine learning lag-based data conversion model 214 can represent an orders predictor converter, which can include at least one regression model.

Further, as depicted in FIG. 2, bank statement data 224 (which can include, e.g., market segment level data), in conjunction with output(s) from machine learning lag-based data conversion model 214 and supplemental information regressor 212, are processed by resource-related action classifier 216. In such an example use case, resource-related action classifier 216 can represent a bank statement grand total forecast model, and can include a hyperparameter optimizer 217. In one or more embodiments, resource-related action classifier 216 can include at least one time series forecasting model (such as, e.g., Prophet).

Additionally or alternatively, in one or more embodiments, resource-related action classifier 216 can include using one or more multivariate time series models (e.g., NeuralProphet, DeepVAR, etc.) and/or one or more regression models (e.g., XGBoost) in connection with data including a target variable (e.g., revenue), order data converted to payment data using at least one lag-based linear regression model, and invoices data (including partial invoice information) aggregated on the basis of a given temporal period (e.g., per week) and forecasted using at least one additional time-series model. In such an embodiment, hyperparameter tuning can be carried out, for example, using Bayesian optimization (e.g., to reduce runtime), at least one grid-search technique and/or one or more random search cross-validation mechanisms. Accordingly, in such an embodiment, the final output can include the revenue forecast for the current quarter extended up to the forthcoming quarter.

Accordingly, such as detailed above in connection with the FIG. 2 example, one or more embodiments include translating orders to payment information using lagged-based machine learning techniques in connection with related action classification(s). In such an embodiment, different lag values can be used in connection with different temporal periods and/or values as part of forecasting resource-related information and/or classifying resource-related actions. A dynamic lag-based approach can assist in resource-related forecasting and/or resource-related action classification in analyzing different resource-related and/or user-related behavior across different temporal periods (as compared, for example, to averaged data across temporal periods).

By way merely of example and illustration, consider an example embodiment which includes a label of payment amount for a particular week and a feature of order revenue. Such an example embodiment can include using a given lag value (e.g., lag0), which is the order revenue of the same week. Further, in such an example embodiment, the target variable is a bank statement, and feature selection provides correlation with the bank statement dealing with a given previous quarter (e.g., Q4) separately, as correlation (evidenced, for example, using at least one heat map) for that quarter was different from other previous quarters. Selecting the feature(s), such an example embodiment further includes training at least one linear model wherein a goal of the at least one model is to predict the bank statement based on the feature(s) or a subset thereof.

By way of further example and illustration, consider an example embodiment which includes converting accounts receivable weekly revenue order date data to an accounts receivable weekly extrapolated revenue payment date data. Such an embodiment also includes utilizing time-based data segmentation, wherein one segment represents Q1-Q3 data and another segment represents Q4 data. Additionally, such an embodiment includes utilizing another segmentation based on the type of data (e.g., revenue derived from different user types). Each segment can then be modeled separately to identify different patterns and/or trends, as part of forecasting and/or classifying payment revenue based on order data. By way of further example, one or more embodiments, can include training an order to payment predictor model primarily on recent data (e.g., data obtained within a given temporal period), which can facilitate the model to capture one or more new trends of behavior.

It is to be appreciated that some embodiments described herein utilize one or more artificial intelligence models. It is to be appreciated that the term "model," as used herein, is intended to be broadly construed and may comprise, for example, a set of executable instructions for generating computer-implemented predictions. For example, one or more of the models described herein may be trained to generate predictions based on historical data, user data, enterprise data, behavior data, etc., and such predictions can be used to initiate one or more automated actions (e.g., automatically generating and/or outputting communications to one or more users, automatically training one or more artificial intelligence techniques, etc.).

Figure 3:
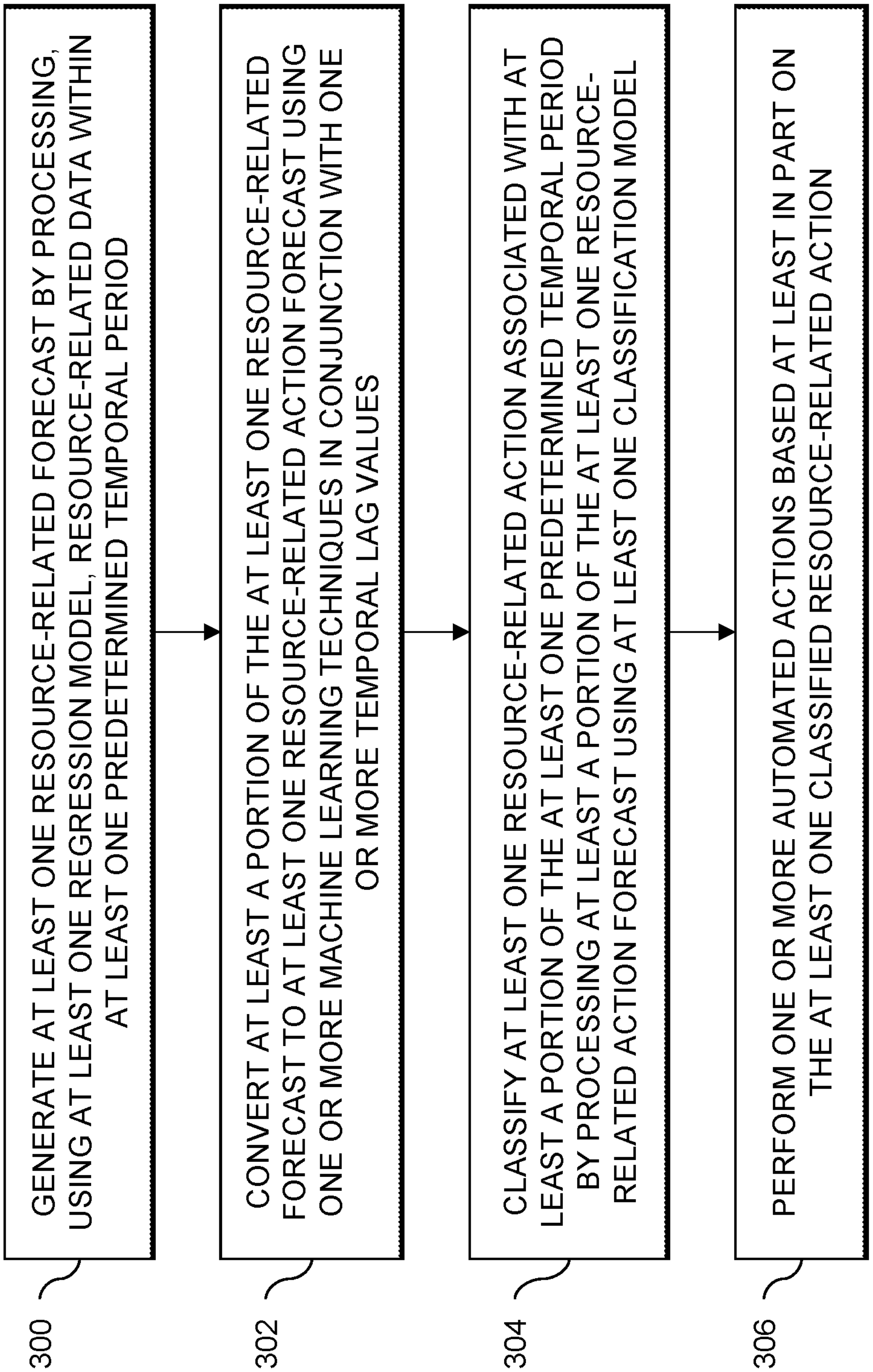
FIG. 3 is a flow diagram of a process for dynamic action classification using machine learning techniques in an illustrative embodiment.

FIG. 3 is a flow diagram of a process for dynamic action classification using machine learning techniques in an illustrative embodiment. It is to be understood that this particular process is only an example, and additional or alternative processes can be carried out in other embodiments.

In this embodiment, the process includes steps 300 through 306. These steps are assumed to be performed by resource-related action classification system 105 utilizing elements 110, 112, 114, 116 and 118.

Step 300 includes generating at least one resource-related forecast by processing, using at least one regression model, resource-related data within at least one predetermined temporal period. In at least one embodiment, generating at least one resource-related forecast includes segmenting at least a portion of the resource-related data into multiple data segments, and implementing a respective regression model for each of the multiple data segments. In such an embodiment, segmenting at least a portion of the resource-related data into multiple data segments can include segmenting the at least a portion of the resource-related data into multiple time-based data segments and/or segmenting the at least a portion of the resource-related data into multiple data type-based segments.

Step 302 includes converting at least a portion of the at least one resource-related forecast to at least one resource-related action forecast using one or more machine learning techniques in conjunction with one or more temporal lag values. In one or more embodiments, converting at least a portion of the at least one resource-related forecast to at least one resource-related action forecast includes processing the at least one resource-related forecast and historical resource-related data using the one or more machine learning techniques in conjunction with multiple temporal lag values, wherein the multiple temporal lag values comprise one or more temporal lag values associated with each one of different temporal periods within the historical resource-related data.

Step 304 includes classifying at least one resource-related action associated with at least a portion of the at least one predetermined temporal period by processing at least a portion of the at least one resource-related action forecast using at least one classification model. In at least one embodiment, processing at least a portion of the at least one resource-related action forecast using at least one classification model includes processing the at least a portion of the at least one resource-related action forecast and one or more items of additional resource-related data using one or more time series forecasting models.

Additionally or alternatively, processing at least a portion of the at least one resource-related action forecast using at least one classification model can include one or more multivariate time-series models and/or one or more regression models in connection with a target variable (e.g., revenue). By way merely of example, such an embodiment can include using such a classification model to specifically process order data converted to payment data using at least one lag-based linear regression model, as well as process invoice data (including partial invoice information) aggregated on the basis of a given temporal period (e.g., per week) and forecasted using at least one additional time-series model. Further, in such an embodiment, the output of the classification model can include, for example, classification of forecasted revenue into one or more particularly future temporal period-based categories, such as, for example, classifying certain forecasted revenue into a category associated with the current fiscal quarter, classifying other forecasted revenue into a category associated with the forthcoming quarter, etc.

Step 306 includes performing one or more automated actions based at least in part on the at least one classified resource-related action. In one or more embodiments, performing one or more automated actions includes automatically generating at least one communication to at least one user based at least in part on the at least one classified resource-related action. Additionally or alternatively, performing one or more automated actions can include automatically training, using feedback related to the at least one classified resource-related action, at least a portion of the at least one regression model, at least a portion of the one or more machine learning techniques, and/or at least a portion of the at least one classification model.

Additionally, it is to be noted and acknowledged that, in one or more embodiments, the automated action(s) referred to in step 306 are distinct from actions associated with the at least one resource-related action forecast and the at least one classified action referred to in steps 302 and 304.

Accordingly, the particular processing operations and other functionality described in conjunction with the flow diagram of FIG. 3 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to dynamically classify actions using machine learning techniques. These and other embodiments can effectively overcome problems associated with inaccurate and/or inconsistent results.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 4 and 5. Although described in the context of system 100, these platforms may also be used to implement at least portions of other information processing systems in other embodiments.

Figure 4:
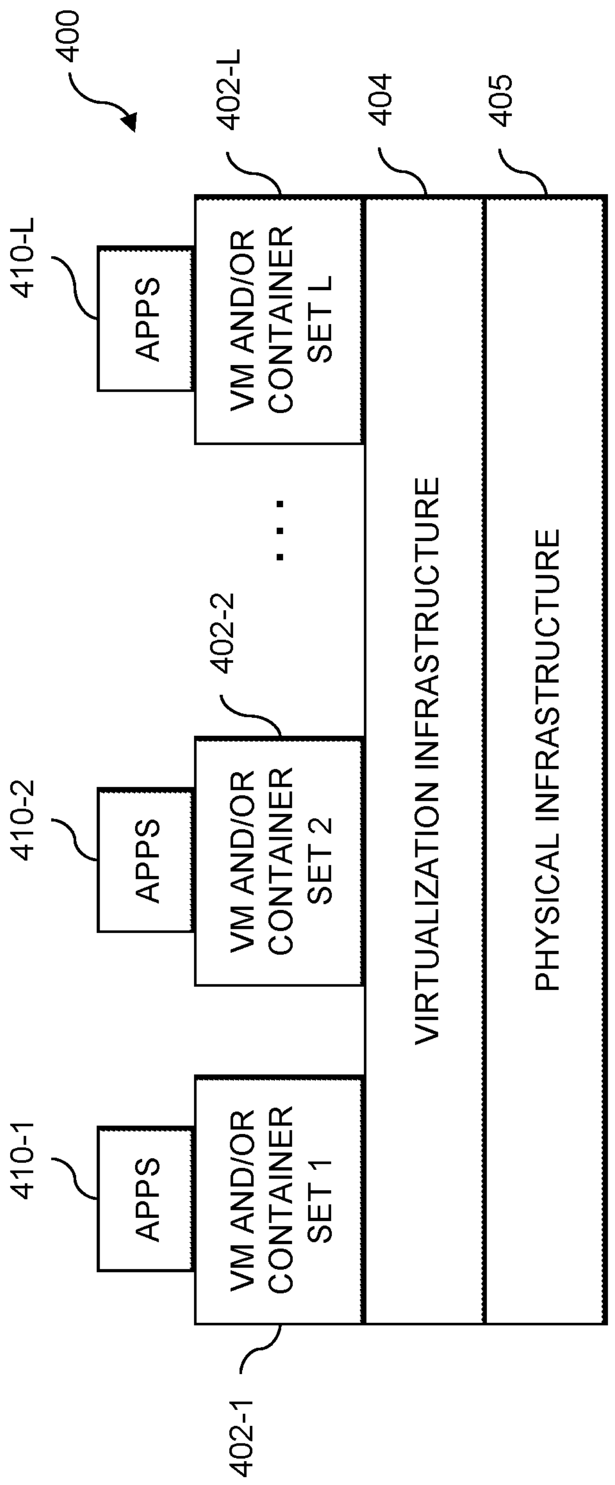
FIGS. 4 and 5 show examples of processing platforms that may be utilized to implement at least a portion of an information processing system in illustrative embodiments.
Figure 5:
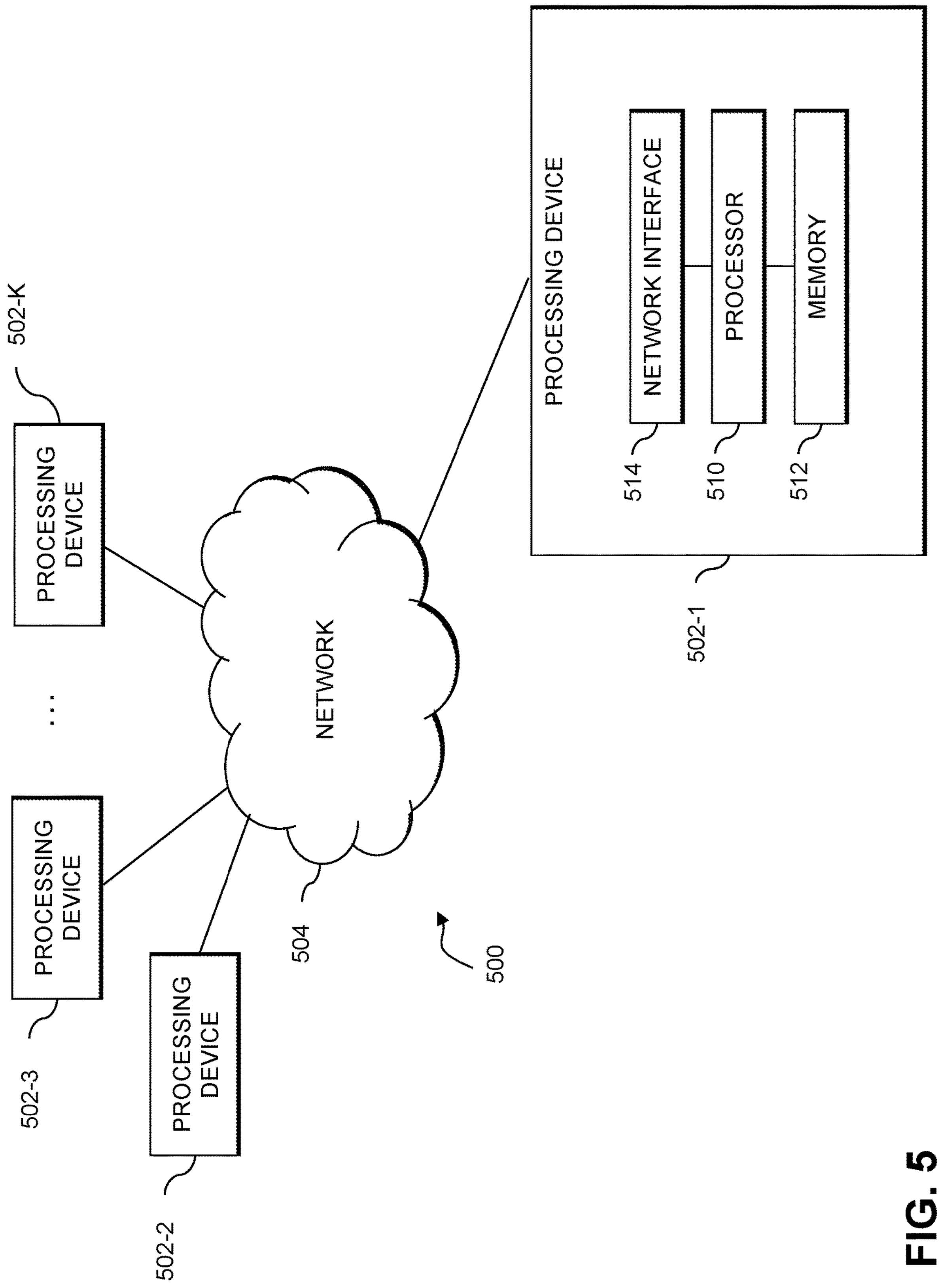

FIG. 4 shows an example processing platform comprising cloud infrastructure 400. The cloud infrastructure 400 comprises a combination of physical and virtual processing resources that are utilized to implement at least a portion of the information processing system 100. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 comprise respective VMs, respective sets of one or more containers, or respective sets of one or more containers running in VMs. In some implementations of the FIG. 4 embodiment, the VMs/container sets 402 comprise respective VMs implemented using virtualization infrastructure 404 that comprises at least one hypervisor.

A hypervisor platform may be used to implement a hypervisor within the virtualization infrastructure 404, wherein the hypervisor platform has an associated virtual infrastructure management system. The underlying physical machines comprise one or more information processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-K, which communicate with one another over a network 504.

The network 504 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 502-1 in the processing platform 500 comprises a processor 510 coupled to a memory 512.

The processor 510 comprises a microprocessor, a CPU, a GPU, a TPU, a microcontroller, an ASIC, a FPGA or other type of processing circuitry, as well as portions or combinations of such circuitry elements.

The memory 512 comprises random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

generating, in an ensemble learning model of a processor-based machine learning system, at least one resource-related forecast by processing resource-related data within at least one predetermined temporal period, the processor-based machine learning system further comprising a supervised learning model and a classification model, wherein the ensemble learning model, the supervised learning model and the classification model are interconnected in a processing pipeline of the processor-based machine learning system;

converting, in the supervised learning model, at least a portion of the at least one resource-related forecast to at least one resource-related action forecast using one or more temporal lag values;

classifying, in the classification model, at least one resource-related action associated with at least a portion of the at least one predetermined temporal period by processing at least a portion of the at least one resource-related action forecast; and performing one or more automated actions based at least in part on the at least one resource-related action;

wherein the method is performed by at least one processing device comprising a processor coupled to a memory.

2. The computer-implemented method of claim 1, wherein converting the at least a portion of the at least one resource-related forecast to the at least one resource-related action forecast comprises processing the at least one resource-related forecast and historical resource-related data using the supervised learning model in conjunction with multiple temporal lag values, wherein the multiple temporal lag values comprise one or more temporal lag values associated with each one of different temporal periods within the historical resource-related data.

3. The computer-implemented method of claim 1, wherein the ensemble learning model comprises a decision tree gradient boosting algorithm, and wherein generating the at least one resource-related forecast comprises segmenting at least a portion of the resource-related data into multiple data segments, and implementing a respective decision tree for each of the multiple data segments.

4. The computer-implemented method of claim 3, wherein segmenting the at least a portion of the resource-related data into the multiple data segments comprises segmenting the at least a portion of the resource-related data into multiple time-based data segments.

5. The computer-implemented method of claim 3, wherein segmenting the at least a portion of the resource-related data into the multiple data segments comprises segmenting the at least a portion of the resource-related data into multiple data type-based segments.

6. The computer-implemented method of claim 1, wherein processing the at least a portion of the at least one resource-related action forecast using the classification model comprises processing the at least a portion of the at least one resource-related action forecast and one or more items of additional resource-related data using one or more time series forecasting models.

7. The computer-implemented method of claim 1, wherein performing the one or more automated actions comprises automatically generating at least one communication to at least one user based at least in part on the at least one resource-related action.

8. The computer-implemented method of claim 1, wherein performing the one or more automated actions comprises automatically training at least a portion of the ensemble learning model using feedback related to the at least one resource-related action.

9. The computer-implemented method of claim 1, wherein performing the one or more automated actions comprises automatically training at least a portion of the supervised learning model using feedback related to the at least one resource-related action.

10. The computer-implemented method of claim 1, wherein performing the one or more automated actions comprises automatically training at least a portion of the classification model using feedback related to the at least one resource-related action.

11. A non-transitory processor-readable storage medium having stored therein program code of one or more software programs, wherein the program code when executed by at least one processing device causes the at least one processing device:

to generate, in an ensemble learning model of a processor-based machine learning system, at least one resource-related forecast by processing resource-related data within at least one predetermined temporal period, the processor-based machine learning system further comprising a supervised learning model and a classification model, wherein the ensemble learning model, the supervised learning model and the classification model are interconnected in a processing pipeline of the processor-based machine learning system;

to convert, in the supervised learning model, at least a portion of the at least one resource-related forecast to at least one resource-related action forecast using one or more temporal lag values;

to classify, in the classification model, at least one resource-related action associated with at least a portion of the at least one predetermined temporal period by processing at least a portion of the at least one resource-related action forecast; and to perform one or more automated actions based at least in part on the at least one resource-related action.

12. The non-transitory processor-readable storage medium of claim 11, wherein the functionality to convert the at least a portion of the at least one resource-related forecast to the at least one resource-related action forecast comprises processing the at least one resource-related forecast and historical resource-related data using the supervised learning model in conjunction with multiple temporal lag values, wherein the multiple temporal lag values comprise one or more temporal lag values associated with each one of different temporal periods within the historical resource-related data.

13. The non-transitory processor-readable storage medium of claim 11, wherein the ensemble learning model comprises a decision tree gradient boosting algorithm, and wherein the functionality to generate the at least one resource-related forecast comprises segmenting at least a portion of the resource-related data into multiple data segments, and implementing a respective decision tree for each of the multiple data segments.

14. The non-transitory processor-readable storage medium of claim 13, wherein segmenting the at least a portion of the resource-related data into the multiple data segments comprises segmenting the at least a portion of the resource-related data into multiple time-based data segments.

15. The non-transitory processor-readable storage medium of claim 11, wherein processing the at least a portion of the at least one resource-related action forecast using the classification model comprises processing the at least a portion of the at least one resource-related action forecast and one or more items of additional resource-related data using one or more time series forecasting models.

16. An apparatus comprising:

at least one processing device comprising a processor coupled to a memory;

the at least one processing device being configured:

to generate, in an ensemble learning model of a processor-based machine learning system, at least one resource-related forecast by processing resource-related data within at least one predetermined temporal period, the processor-based machine learning system further comprising a supervised learning model and a classification model, wherein the ensemble learning model, the supervised learning model and the classification model are interconnected in a processing pipeline of the processor-based machine learning system;

to convert, in the supervised learning model, at least a portion of the at least one resource-related forecast to at least one resource-related action forecast using one or more temporal lag values;

to classify, in the classification model, at least one resource-related action associated with at least a portion of the at least one predetermined temporal period by processing at least a portion of the at least one resource-related action forecast; and to perform one or more automated actions based at least in part on the at least one classified resource-related action.

17. The apparatus of claim 16, wherein the functionality to convert the at least a portion of the at least one resource-related forecast to the at least one resource-related action forecast comprises processing the at least one resource-related forecast and historical resource-related data using the supervised learning model in conjunction with multiple temporal lag values, wherein the multiple temporal lag values comprise one or more temporal lag values associated with each one of different temporal periods within the historical resource-related data.

18. The apparatus of claim 16, wherein the ensemble learning model comprises a decision tree gradient boosting algorithm, and wherein the functionality to generate the at least one resource-related forecast comprises segmenting at least a portion of the resource-related data into multiple data segments, and implementing a respective decision tree for each of the multiple data segments.

19. The apparatus of claim 18, wherein segmenting the at least a portion of the resource-related data into the multiple data segments comprises segmenting the at least a portion of the resource-related data into multiple time-based data segments.

20. The apparatus of claim 16, wherein processing the at least a portion of the at least one resource-related action forecast using the classification model comprises processing the at least a portion of the at least one resource-related action forecast and one or more items of additional resource-related data using one or more time series forecasting models.

* * * * *